Jan. 18, 1955 B. L. LEVINSON 2,699,621
ILLUMINATED DISPLAY DEVICE
Filed March 30, 1953
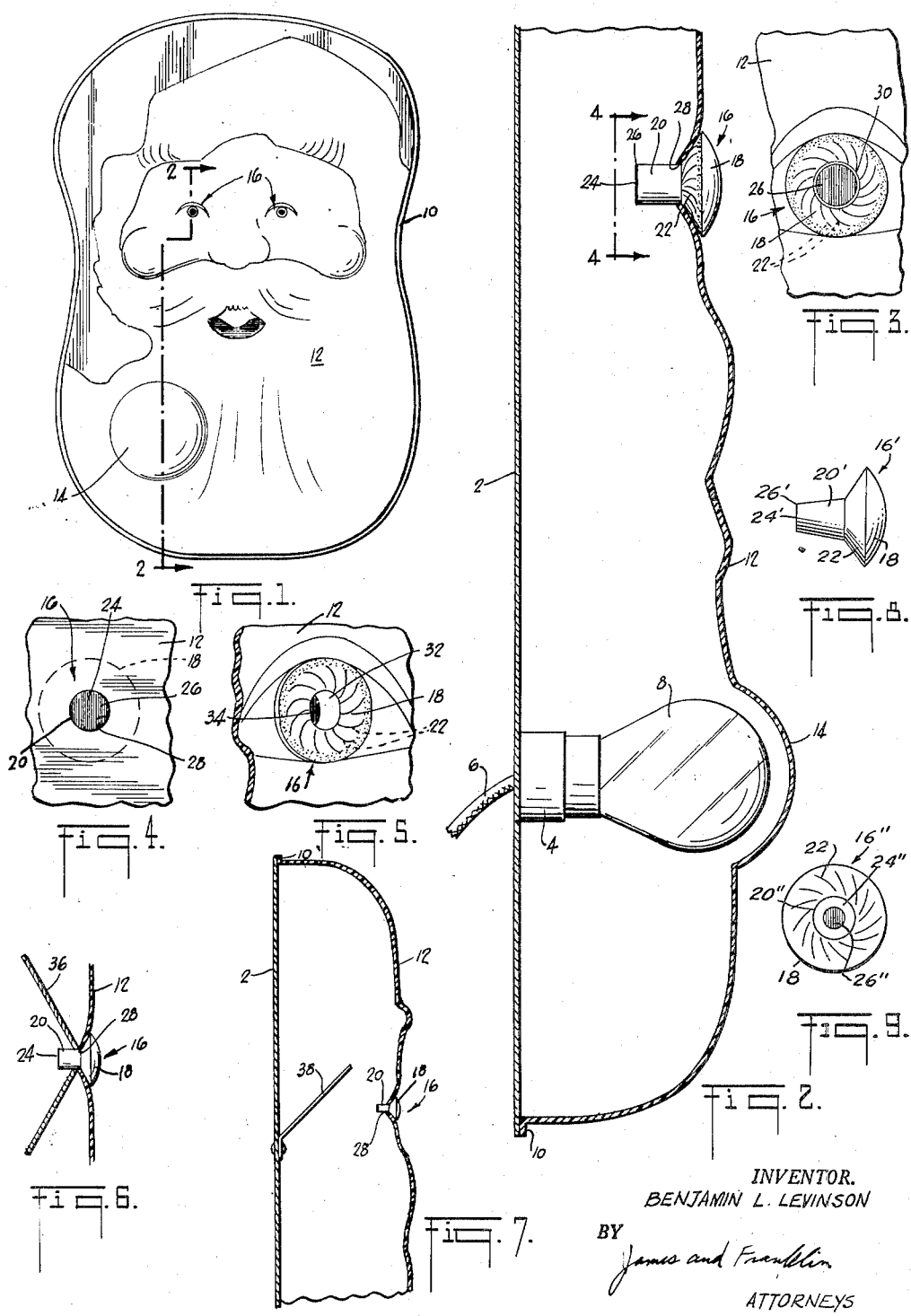
INVENTOR.
BENJAMIN L. LEVINSON
BY
James and Franklin
ATTORNEYS

United States Patent Office 2,699,621
Patented Jan. 18, 1955

2,699,621

ILLUMINATED DISPLAY DEVICE

Benjamin L. Levinson, Groton, Conn., assignor to Royal Electric Company, Westerly, R. I., a corporation of Rhode Island Application March 30, 1953, Serial No. 345,433

10 Claims. (Cl. 40—137)

The present invention relates to an illuminated display device, and in particular to one having eyes incorporated therein so constructed and arranged relative to the source of illumination that the eyes present a particularly brilliant and life-like appearance, and so that the appearance of the eyes will change as an observer moves with respect to the device, the eyes appearing to follow the observer.

Display devices, both illuminated and non-illuminated, simulating the face of a person or animal are quite common. Since the purpose of such display devices is primarily to attract and keep the attention of a passerby, various means have been employed to impart to the device some feature of appearance which will reliably impress itself upon the otherwise casual attention of observers in its vicinity. One time-tested means for accomplishing this result is to cause a particular feature of the display device to stand out from the remainder of the device. Another approach is to impart to the devices an appearance which is as life-like as possible. Yet another approach is to impart an appearance of motion to the display device.

In the human face, or in the face of any other animal, the eyes are perhaps the most brilliant feature of appearance. In addition, the appearance of the eyes of an individual is thought to tell much of his personality, hence such expressions as "he has a twinkle in his eye," representing an individual with a jolly personality. Attempts have been made in the past to incorporate eye-simulating members into display devices and the like which would have an appearance, as to color, texture and anatomy, quite close to that of the human eye. However, such eye structures have failed to simulate the inner life or "twinkle" of the human eye.

One of the most attention-arresting forms of motion in a display device is that appearance of motion which is coordinated automatically with the movement of the viewer relative to the device, and the effect is heightened as the eyes of the display device appear to follow the viewer as he moves past the device. To provide display device elements which actually move in such a manner is very difficult and expensive. Consequently attempts have been made to devise display devices which, because of their odd construction and the optical illusions created thereby, give rise to a simulation of such action. However, such devices are in general rather grotesque in appearance and certainly far from realistic.

According to the present invention, a display device is produced which, by means of an exceedingly simple construction and arrangement of parts, none of which move, attains all of the above desired effects. The device itself, in simulating the face of a person or animal, may be made as realistic or as fanciful in appearance as desired. The eye-simulating members give an appearance of great realism. Moreover, they appear truly living. They sparkle and twinkle. And what is more, they differ in appearance when viewed from different angles, either above, below, or to either side, in such a way that they always appear to be looking at the observer even though the face of the display device does not appear to move. In other words, the eyes appear to move within their sockets so as to follow an observer while the face of the display device is stationary. Thus an effect of motion of the eye is produced without any corresponding effect of motion of the remainder of the face. The attainment of this feature without any actual moving parts is believed to be novel in and of itself.

To accomplish the above, eye-simulating members known per se and shown, for example, in Marcus Patent 2,254,232 of September 2, 1941, are employed in conjunction with a source of illumination positioned to the rear of the wall in which the eye-simulating members are mounted. These members comprise a lens-like part mounted on the front surface of the wall and facing the observer and a stud-like part projecting rearwardly from the center of the lens at the area thereof which corresponds to the pupil of the eye. According to the present invention, the stud is caused to extend for a substantial distance to the rear of the wall, the tip of the stud is rendered opaque, but the side surfaces of the stud which extend to the rear of the mounting wall are left free to transmit light. A source of illumination is provided behind the wall, there mounted in such a way as to illuminate the stud. Since the eye-simulating member is formed of some light-transmissive material, the light which enters the interior of the member through the side surfaces of stud will cause the eye to appear to glisten or twinkle. In addition, when the eye is viewed from the side, a portion of the side surfaces of the stud will be directly visible, and that portion will contrast in appearance with the opaque tip of the stud. The more to the side the eye is viewed, the more of the side surfaces of the stud will become visible and the less of the opaque tip of the stud will be visible. The net effect is that the pupil of the eye will appear to move from side to side or up and down depending upon the movement of the observer relative thereto. The remainder of the display device will not appear to move, and hence a definite simulation of the rolling of the eye in the socket to follow the movement of an observer will result.

In addition, because the material of which the eye-simulating members is formed will usually be more readily light-transmissive than the wall on which those members are mounted, the eyes will appear to be brighter than the remainder of the device, will stand out in a very noticeable fashion, and thus will constitute an attention-catching feature independently of the appearance of motion to which they give rise.

To the accomplishment of the above and to such other objects as may hereinafter appear, the present invention relates to an illuminated display device and to the construction and arrangement of the parts thereof as defined in the appended claims and as described in this specification, taken together with the accompanying drawings, in which:

Fig. 1 is a front plan view of a typical embodiment;

Fig. 2 is a cross sectional view on an enlarged scale taken along the line 2—2 of Fig. 1;

Fig. 3 is a fragmentary front elevational view of one of the eye-simulating members when viewed from directly in front thereof;

Fig. 4 is a fragmentary rear elevational view similar to Fig. 3;

Fig. 5 is a fragmentary perspective view of the eye-simulating member of Fig. 3, taken from a point approximately 45 degrees horizontally removed from the viewpoint of Fig. 3;

Fig. 6 is a fragmentary cross sectional view showing a modification of the manner in which the eye-simulating member may be mounted in the front wall of the device, and with a light-collecting reflector surrounding the stud portion thereof;

Fig. 7 is a fragmentary view similar to Fig. 2 but showing a modification in which a light-reflector is mounted within the display device; and Figs. 8 and 9 are side elevational and rear plan views respectively of different modifications of the eye-simulating member.

The display device is here illustrated as simulating the face of a fanciful individual, and specifically the face of Santa Claus, but it will be appreciated that the invention is applicable to numerous other forms and types of display devices.

The embodiment here specifically disclosed comprises an enclosure defined by a rear wall 2 of cardboard, metal, plastic or any suitable structural material, on which a light socket 4 is mounted, the wire 6 connecting that light socket to any suitable source of electric power passing through the wall 2 as shown. A light bulb 8 is adapted to be mounted in the socket 4 and illuminated. Of course, if desired, a battery or other self-contained source of electric power could be built into the device.

Mounted on the rear wall 2, and secured thereto in any desired manner, as by means of an adhesively secured flange 10 is a sheet 12 of material configured and ornamented so as to simulate any desired object, here the face of Santa Claus. The sheet 12 defines the front and side walls of the enclosure, and is spaced sufficiently from the rear wall 2 so as to provide room for the bulb 8. As here disclosed, a portion of the sheet 12 is bulged outwardly at 14 so as to accommodate part of the bulb 8. The sheet 12 may be made of any desired material and may be either opaque or translucent, as desired. It is preferred that the sheet 12 be at least partially translucent so that the entire face formed thereby will appear to glow. Sheet plastic material, such as one of the vinyl resins, for example, is eminently adapted for such use because of its inexpensiveness, the ease with which it may be caused to assume desired configurations, and the comparative ease with which it may be ornamented or colored.

At that portion of the face of the display device defined by the sheet 12 where the eyes of the simulated figure would normally appear, eye-simulating members 16 are provided. These members are similar to those shown in Marcus Patent 2,254,232, referred to above. They comprise a single piece of transparent material shaped to form a substantially circular button-like or iris portion 18 and a cylindrical stud 20 projecting rearwardly therefrom. The inner surface 22 of the iris portion 18 immediately surrounding the stud 20 is provided with radial corrugations or serrations, preferably made unusually deep, distinct, and accurate, to simulate iris lines, and coloring material may be applied to the portions 22 in order to produce members simulating eyes of any desired color. The stud 20 projects rearwardly from the iris portion 18 for an appreciable distance, and its tip 24 is rendered opaque by a layer 26 of black paint or the like. The side surfaces of the stud 20, however, are left clear and unobstructed. The eye-simulating members 16 may be made of any suitable transparent or translucent material, plastic being preferred due to its ease of manufacture. A cellulose acetate plastic, of which Tenite is an example, is preferred, but other transparent plastics may be used, such as those known under the trade names Lumarith, Lucite and Plasticil.

The eye-simulating members 16 are mounted in the wall 12 in any appropriate manner so that the iris portions 18 thereof are on the outside of the wall 12 and the studs 20 thereof extend inwardly from the wall 12 for a substantial distance. The stud 20 may be a press-fit in an aperture 28 formed in the wall 12, adhesive may be employed if desired to facilitate the security of attachment of the members 16 or, in some instances, resilient clips of conventional character may grasp the stud 20 and hold it in position. When such resilient clips are employed, it is well for them to be as highly light-transmissive as possible in order to prevent them from interfering with the optical effects hereinafter to be described or from casting a shadow on the sheet 12 when that sheet is translucent.

The light from the bulb 8 fills the enclosure defined by the wall 2 and the sheet 12 and enters the member 16 via the side surfaces of the stud 20. Some of this light will emanate from the front surface of the iris portion 18, and the eye will therefore sparkle or twinkle and will have an extremely life-like appearance. In addition, even if the sheet 12 should be formed of some translucent material, the member 16 will preferably pass light more readily than the sheet 12, so that the eyes will be brighter than the face and thus stand out therefrom. Some light will also pass through that portion of the sheet 12 which underlies the outer part of the iris portion 18, thus further heightening the life-like inner-illumination effect imparted to the members 16.

When one views the eye-simulating members 16 from directly in front, the tip 24 of the stud 20 will be substantially completely visible but, because that tip is rendered opaque by the paint 26, it will appear as a black and contrastingly unilluminated portion, as shown in Fig. 3. Because of the scattering effect exerted on the light which enters the stud 20 through its side surfaces, and through the outer part of the iris portion 18, the opaque tip 24 of the stud 20 may appear to be surrounded by a thin ring 30 of illumination, thus heightening the contrast of the eye and giving it a highlighted appearance. If desired, this effect may be intensified either by forming the stud 20' so that it tapers slightly, as in Fig. 8, or by covering all but a thin peripheral ring of the stud tip 24" with the opaque paint 26", as in Fig. 9.

If the observer should move to the side, the face defined by the sheet 12 will not appear to move but will instead actually retain and appear to retain its initial orientation. However, when the viewer moves to the side his line of sight through the member 16 will be at an angle to the axis of that member, and consequently a portion of the side surface of the stud 20 will be directly visible. Similarly, only a segment of the opaque stud tip 24 will be visible. Since the side surfaces of the stud 20 are clear and transmit light freely, the optical result is that illustrated in Fig. 5, the pupil-simulating portion of the member 16 now being defined by a crescent 32 which is brightly illuminated and clear and by only a small black area 34. As Fig. 5 illustrates, the appearance is quite clearly one of an eye which has been turned in its socket so as to be directed toward the observer. The relative amounts of clear illuminated area 32 and dark opaque area 34 which the observer will see will depend upon its particular viewpoint. The farther he is away from a point directly in front of the member 16, the greater will be the illuminated area 32 and the less will be the dark area 34.

In the embodiment of Fig. 2, no special means are provided to ensure adequate illumination of the side surfaces of the stud 20, the light from the bulb 8 being substantially uniformly diffused within the enclosure so as to achieve the desired results. If increased pupil brilliancy is desired, the modification disclosed in Fig. 6 may be resorted to, the stud 20 being surrounded by a conical light-gathering member 36 the inner surface of which is reflective in such a way as to reflect the bulk of the light received by that surface against the side surfaces of the stud 20. Another modification having the same general objective of increasing the brilliancy of the eyes is disclosed in Fig. 7, where a light-reflective member 38 is mounted on the wall 2 behind the stud 20 and substantially in line therewith, thus ensuring that a substantial proportion of the light from the bulb 8 will be directed onto the eye area of the device.

The bulged portion 14 in the sheet 12, as here disclosed, may serve a purpose other than merely accommodating the bulb 8. Because it is very close to that bulb, it will tend to be more brightly illuminated than the remainder of the sheet 12, and thus will constitute a brightly lighted area which, because of its incongruity, will tend to arrest the attention of the observer, and on which, if desired, any suitable advertising matter may be printed.

By utilizing the eye-simulating members 16 in conjunction with a source of illumination 8, and by making various portions of those members opaque and light-transmissive, as disclosed, a display device has been produced the eyes of which not only simulate the shape and color of the human eyes, as was the case with the eyes of Marcus Patent 2,254,232, but which also give an appearance of inner illumination or "life" which is highly realistic and which imparts a personality to the figure which the display device is simulating. In addition, by the arrangement of parts aforesaid, and without using any moving parts whatsoever, the life-like and attention-catching effect of the eyes in particular and the display device as a whole is greatly accentuated because the eyes appear to move in their sockets and follow the observer as he moves relative to the display device.

While but a single embodiment of the present invention and a limited number of modifications have been here disclosed, it will be apparent that the details thereof may be widely varied, all within the spirit of the present invention as defined in the following claims.

I claim:

1. A display device comprising a wall, a light source behind said wall and an eye-simulating member comprising an iris portion with a substantially cylindrical stud projecting substantially centrally rearwardly therefrom, penetrating said wall, and extending a substantial distance behind said wall, said member being formed of light-transmissive material and the end of said stud being rendered opaque, the side walls of said stud being light-transmissive and exposed over a substantial area to illumination by said light source, said stud comprising a pupil-simulating part, whereby a brilliant and realistic highlight effect is imparted to the pupil of said eye which causes the eye to appear to move as an observer shifts his viewpoint relative thereto.

2. The display device of claim 1, in which said wall is light-transmissive, but to a substantially lesser degree than said member, said display device thereby being illuminated overall but the area around the "pupil" of said eye-simulating member being caused to stand out in brilliance.

3. The display device of claim 1, in which the end of said stud is rendered opaque by a layer of paint applied thereto, the exposed side walls of said stud being free of paint.

4. The display device of claim 3, in which a thin peripheral ring on the end of said stud is free of paint and is therefore rendered light-transmissive.

5. The display device of claim 3, in which said stud tapers slightly toward its end.

6. A display device comprising rear, front and side walls defining a substantially complete enclosure, said front wall being configured to simulate a face, a source of illumination within said enclosure, and an eye-simulating member mounted on said front wall at the appropriate area thereof, said member comprising an iris portion with a substantially cylindrical stud projecting substantially centrally rearwardly therefrom, penetrating said wall, and extending a substantial distance behind said wall, said member being formed of light-transmissive material and the end of said stud being rendered opaque, the side walls of said stud being light-transmissive and exposed over a substantial area to illumination by said light source, said stud comprising a pupil-simulating part, whereby a brilliant and realistic highlight effect is imparted to the pupil of said eye which causes the eye to appear to move as an observer shifts his viewpoint relative thereto.

7. The display device of claim 6, in which said wall is light-transmissive, but to a substantially lesser degree than said member, said display device thereby being illuminated overall but the area around the "pupil" of said eye-simulating member being caused to stand out in brilliance.

8. The display device of claim 6, in which said light source is displaced from said stud, one of said walls mounting a reflector inside said device so oriented with respect to said light source and said stud as to direct light from the former to the latter.

9. The display device of claim 8, in which said reflector is mounted on said rear wall substantially in line with said stud and inclined away from said light source.

10. The display device of claim 8, in which said reflector is conical, mounted on said front wall around said stud, and extends into said enclosure and away from said stud.

References Cited in the file of this patent

UNITED STATES PATENTS

| | | |
|---|---|---|
| 1,622,196 | Howell | Mar. 22, 1927 |
| 2,086,665 | Fisher | July 13, 1937 |
| 2,254,232 | Marcus | Sept. 2, 1941 |
| 2,399,121 | Janson | Apr. 23, 1946 |
| 2,589,462 | Wagner | Mar. 18, 1952 |
| 2,601,107 | Ellett | June 17, 1952 |
| 2,604,728 | Nudelman | July 29, 1952 |